United States Patent
Takai

(10) Patent No.: US 7,370,841 B2
(45) Date of Patent: May 13, 2008

(54) ROCKING FULCRUM MEMBER

(75) Inventor: Nozomi Takai, Tsuchiura (JP)

(73) Assignees: Tokyo Seimitsu Co., Ltd., Mitaka-shi, Tokyo (JP); Tosei Engineering Corp., Tsuchiura-shi, Ibaraki (JP)

( * ) Notice: Subject to any disclaimer, the term of this patent is extended or adjusted under 35 U.S.C. 154(b) by 429 days.

(21) Appl. No.: 11/068,918

(22) Filed: Mar. 2, 2005

(65) Prior Publication Data

US 2005/0194504 A1  Sep. 8, 2005

(30) Foreign Application Priority Data

Mar. 3, 2004  (JP) .............................. 2004-058989

(51) Int. Cl.
B25G 3/00 (2006.01)
(52) U.S. Cl. .................... 248/560; 24/563; 403/325
(58) Field of Classification Search ................ 248/300, 248/65, 74.2, 560, 592, 618, 316.7, 316.8; 24/563, 545, 546, 570; 403/325
See application file for complete search history.

(56) References Cited

U.S. PATENT DOCUMENTS

| | | | |
|---|---|---|---|
| 3,807,029 A | | 4/1974 | Troeger |
| 4,402,118 A | * | 9/1983 | Benedetti ...................... 24/289 |
| 5,526,553 A | * | 6/1996 | Klein ........................... 24/295 |
| 5,709,574 A | * | 1/1998 | Bianca et al. ............... 439/858 |
| 6,051,781 A | * | 4/2000 | Bianca et al. ............... 174/351 |
| D516,904 S | * | 3/2006 | Kendrick ..................... D8/395 |

FOREIGN PATENT DOCUMENTS

WO  WO 98/20297  5/1998

* cited by examiner

*Primary Examiner*—Carl D. Friedman
*Assistant Examiner*—Steven Marsh
(74) *Attorney, Agent, or Firm*—David S. Safran

(57) ABSTRACT

The crisscross fulcrum according to the present invention is formed as a continuous member by fabricating one elastic member in the form of a plate. Therefore, the rocking fulcrum member can be obtained as a precise fulcrum member at a low cost with reduced variations in the spring characteristic and can be easily assembled. Additionally, in the present invention, it is preferable that a heat treatment should be performed on the crisscross spring formed by fabricating the one elastic member in the form of a plate. By the heat treatment performed after fabricating for forming the crisscross spring, the spring characteristic is improved.

17 Claims, 5 Drawing Sheets

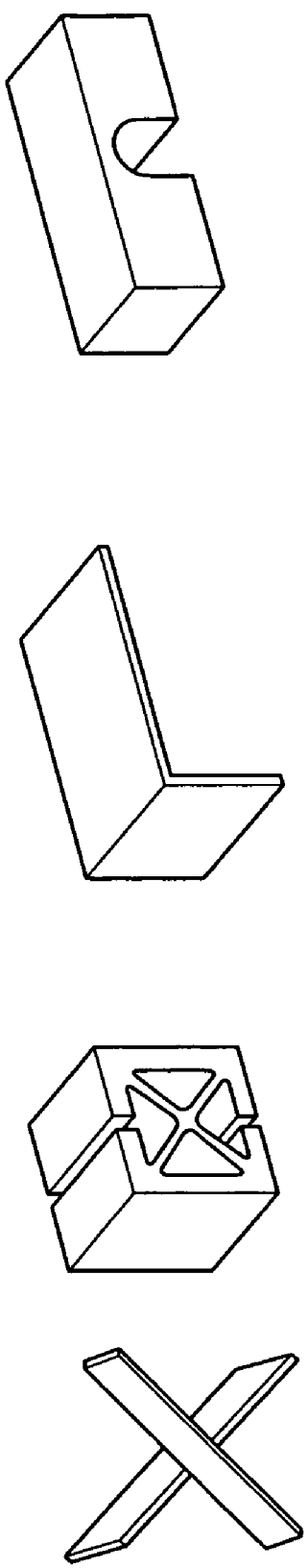

ROCKING FULCRUM MEMBER

BACKGROUND OF THE INVENTION

1. Field of the Invention

The present invention relates to a rocking fulcrum member and, more particularly, to a crisscross-spring-type rocking fulcrum member used in a lever-type detector or the like.

2. Description of the Related Art

In lever-type detectors or the like, a finger arm having a contactor attached to its tip is supported on a rocking fulcrum so as to be able to seesaw. The detector detects the amount of movement of the finger arm when the contactor is in contact with a work.

Examples of rocking fulcrum members used in such detectors are an elastic fulcrum such as shown in FIG. 7C, an L-shaped spring fulcrum such as shown in FIG. 7B, a bearing (not shown) and crisscross spring fulcrums such as shown in FIG. 7A. Elastic fulcrums are capable of operating with accuracy but can be used only in a case where the measurement range is narrow because they have only restricted swing angles.

L-shaped spring fulcrums are low-priced and are being widely used but have a drawback in that the fulcrum center is shifted with a swinging movement and cannot be suitably used as a precise fulcrum member. Bearing fulcrums can have any swing angle but need periodical replacement because their accuracy is reduced due to wear.

Crisscross spring fulcrums include those formed by disposing two plate springs so that the plate springs cross each other as shown on the left-hand side of FIG. 7A, and those integrally formed by being cut by wire cutting as shown on the right-hand side of FIG. 7A. The latter have sufficient rigidity and high accuracy during repeated use and can therefore be suitably used as a precise fulcrum.

A crisscross spring fulcrum such as shown on the left-hand side of FIG. 7A is fixed by screwing opposite ends of the two plate springs to members or by welding the opposite ends to the members. A method of die-casting a crisscross spring base member and embedding the opposite ends of the two plate springs in the crisscross spring base member at the time of casting is also used (see, for example, WO 98/20297 pamphlet).

A crisscross spring fulcrum having two plate springs welded to grooves in a cylindrical housing has also been proposed (see, for example, U.S. Pat. No. 3,807,029).

In assembly of the above-described crisscross spring fulcrum member fixed by screwing opposite ends of the two plate springs to members has problems that a considerably long time is required for assembly and variations in spring characteristic occur due to assembly errors. The crisscross spring fulcrum having two plate springs embedded in a crisscross spring base member by die casting as described in WO 98/20297 pamphlet and the crisscross spring fulcrum having two plate springs fixed to a base member by welding as described in U.S. Pat. No. 3,807,029 have a problem that a considerably long time is required for fabricating and the assembly and manufacturing costs are high and another problem that the plate springs are heated at a high temperature at the time of welding or die casting to degrade the spring characteristic.

The crisscross spring fulcrum integrally formed by cutting using wire cutting electrodischarge machining also has a problem that a considerably long time is required for fabricating and the manufacturing cost is high and another problem that the characteristic of the spring degrades with time due to microcracks caused by machining.

SUMMARY OF THE INVENTION

In view of the above-described circumstances, an object of the present invention is to provide a rocking fulcrum member having a crisscross spring fulcrum, capable of being manufactured at a low cost with reduced variations in the spring characteristic, and capable of being easily assembled.

To achieve the above-described object, according to a first aspect of the present invention, there is provided a rocking fulcrum member, comprising: a first elastic plate portion and a second elastic plate portion placed on planes intersecting each other to form a crisscross spring, wherein each of the first elastic plate portion and the second elastic plate portion has extensions from its one end and the other end in its longitudinal direction; the extension from the one end of the first elastic plate portion is bent at an acute angle from the first elastic plate portion, while the extension from the other end of the first elastic plate portion is bent at an obtuse angle from the first elastic plate portion; the extension from the one end of the second elastic plate portion is bent at an obtuse angle from the second elastic plate portion, while the extension from the other end of the second elastic plate portion is bent at an acute angle from the second elastic plate portion; the extension from the one end of the first elastic plate portion and the extension from the one end of the second elastic plate portion are formed as one continuous member on one plane; the extension from the other end of the first elastic plate portion and the extension from the other end of the second elastic plate portion are formed as one continuous member on one plane; and the first elastic plate portion, the extension from the one end of the first elastic plate portion, the extension from the other end of the first elastic plate portion, the second elastic plate portion, the extension from the one end of the second elastic plate portion and the extension from the other end of the second elastic plate portion are a continuous member formed by fabricating one elastic member in the form of a plate.

In the first aspect of the present invention, it is preferable that a width of the first elastic plate portion and a width of the second elastic plate portion should be equal to each other.

To achieve the above-described object, according to a second aspect of the present invention, there is provided a rocking fulcrum member, comprising: a first elastic plate portion, a second elastic plate portion and a third elastic plate portion, the first elastic plate portion and the third elastic plate portion being placed parallel to each other on one plane, the second elastic plate portion being placed between the first elastic plate portion and the third elastic plate portion, the first elastic plate portion, the third elastic plate portion and the second elastic plate portion being placed on planes intersecting each other to form a crisscross spring, wherein each of the first elastic plate portion, the second elastic plate portion and the third elastic plate portion has extensions from its one end and the other end in its longitudinal direction; the extension from the one end of the first elastic plate portion is bent at an acute angle from the first elastic plate portion, while the extension from the other end of the first elastic plate portion is bent at an obtuse angle from the first elastic plate portion; the extension from the one end of the second elastic plate portion is bent at an obtuse angle from the second elastic plate portion, while the extension from the other end of the second elastic plate portion is bent at an acute angle from the second elastic plate portion; the extension from the one end of the third elastic plate portion is bent at an acute angle from the third elastic plate portion, while the extension from the other end of the third elastic plate portion is bent at an obtuse angle from the third elastic plate portion; the extension from the one end of the first elastic plate portion, the extension from the one end of the second elastic plate portion and the extension from the one end of the third elastic plate portion are formed as one continuous member on one plane; the extension from the other end of the first elastic plate portion, the extension from the other end of the second elastic plate portion and the extension from the other end of the third elastic plate portion are formed as one continuous member on one plane; and the first elastic plate portion, the extension from the one end of the first elastic plate portion, the extension from the other end of the first elastic plate portion, the second elastic plate portion, the extension from the one end of the second elastic plate portion, the extension from the other end of the second elastic plate portion, the third elastic plate portion, the extension from the one end of the third elastic plate portion and the extension from the other end of the third elastic plate portion are a continuous member formed by fabricating one elastic member in the form of a plate.

In the second aspect of the present invention, it is preferable that sum of a width of the first elastic plate portion and a width of the third elastic plate portion should be equal to a width of the second elastic plate portion.

In the first or the second aspect of the present invention, it is preferable that an attachment hole for attachment of a member should be formed in each of the continuous member on one plane in which the extension from the one end of each elastic plate portion is formed and the continuous member on one plane in which the extension from the other end of each elastic plate portion is formed.

According to the present invention, the crisscross fulcrum is formed as a continuous member by fabricating one elastic member in the form of a plate. Therefore, the rocking fulcrum member can be obtained as a precise fulcrum member at a low cost with reduced variations in the spring characteristic and can be easily assembled.

In the first or the second aspect of the present invention, it is preferable that a heat treatment should be performed on the crisscross spring formed by fabricating the one elastic member in the form of a plate. By the heat treatment performed after fabricating for forming the crisscross spring, the spring characteristic is improved.

As described above, the crisscross fulcrum in the rocking fulcrum member of the present invention is formed as a continuous member by fabricating one elastic member in the form of a plate and, therefore, the rocking fulcrum member can be obtained as a precise fulcrum member at a low cost with reduced variations in the spring characteristic and can be easily assembled.

BRIEF DESCRIPTION OF THE DRAWINGS

FIGS. 7A to 7C are perspective views of conventional rocking fulcrum members.

DETAILED DESCRIPTION OF THE PREFERRED EMBODIMENTS

Figure 1:
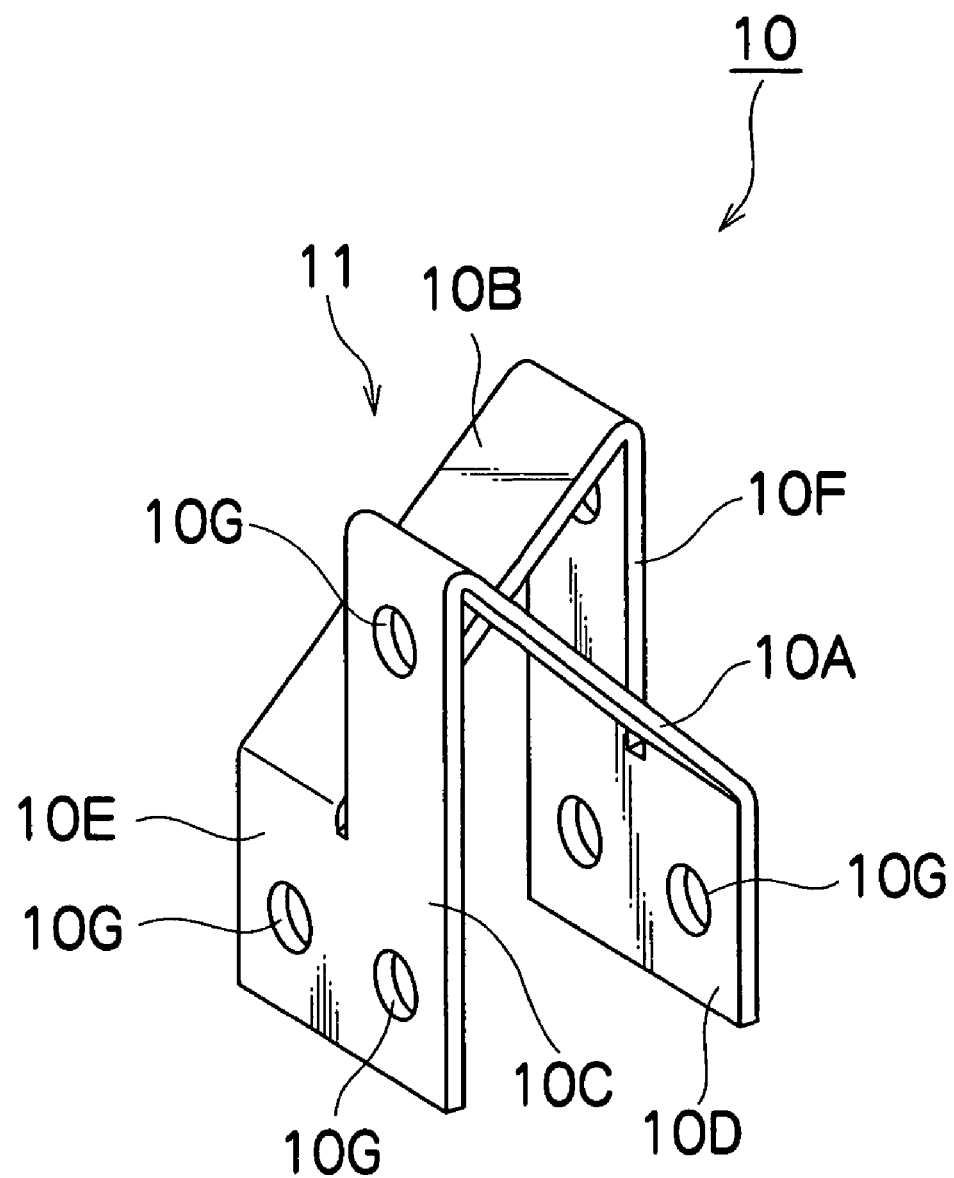
FIG. 1 is a perspective view of a rocking fulcrum member according to an embodiment of the present invention.

A preferred embodiment of a rocking fulcrum member in accordance with the present invention will be described in detail with reference to the accompanying drawings. In the drawings, the same portions or components are indicated by the same reference numerals or symbols.

Figure 2:
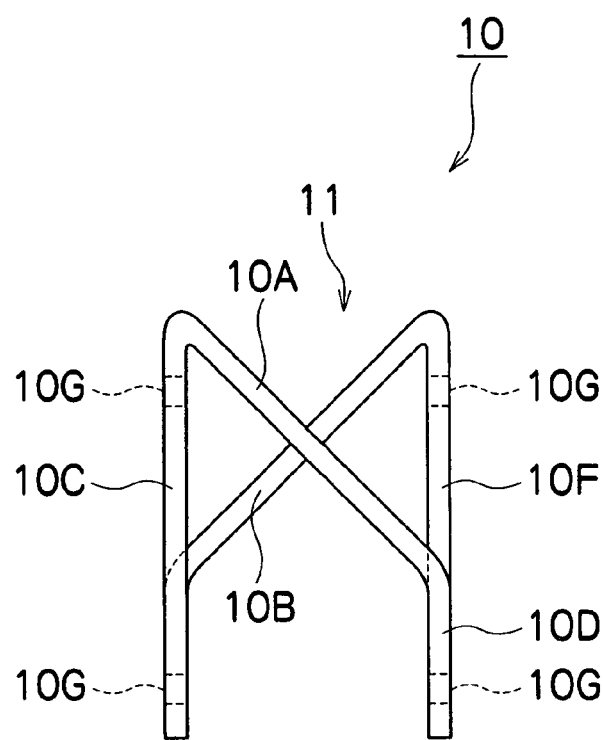
FIG. 2 is a side view of the rocking fulcrum member according to the embodiment of the present invention.

FIG. 1 is a perspective view of an embodiment of a rocking fulcrum member in accordance with the present invention, and FIG. 2 is a side view of the embodiment. As shown in FIGS. 1 and 2, the rocking fulcrum member 10 has a first elastic plate portion 10A and a second elastic plate portion 10B. The surfaces of the first elastic plate portion 10A and the second elastic plate portion 10B cross each other at right angles to form a crisscross spring 11.

An extension 10C from one end of the first elastic plate portion 10A is bent at 45° from the first elastic plate portion 10A, while an extension 10D from the other end of the first elastic plate portion 10A is bent at 135° from the first elastic plate portion 10A.

An extension 10E from one end of the second elastic plate portion 10B is bent at 135° from the second elastic plate portion 10B, while an extension 10F from the other end of the second elastic plate portion 10B is bent at 45° from the second elastic plate portion 10B.

The extension 10C from one end of the first elastic plate portion and the extension 10E from one end of the second elastic plate portion are formed integrally with each other to form one L-shaped flat plate, and the extension 10D from the other end of the first elastic plate portion and the extension 10F from the other end of the second elastic plate portion are also formed integrally with each other to form one L-shaped flat plate. Three attachment holes 10G for attachment of a member are formed in each L-shaped flat plate.

In the rocking fulcrum member 10 having the above-described structure, the L-shaped flat plate portions are parallel to each other in a no-load condition. When a force is applied to the L-shaped flat plate portions in such a direction that the L-shaped flat plate portions are brought closer to each other or moved away from each other, rocking on the crisscross fulcrum formed by the first elastic plate portion 10A and the second elastic plate portion 10B is caused.

Figure 3:
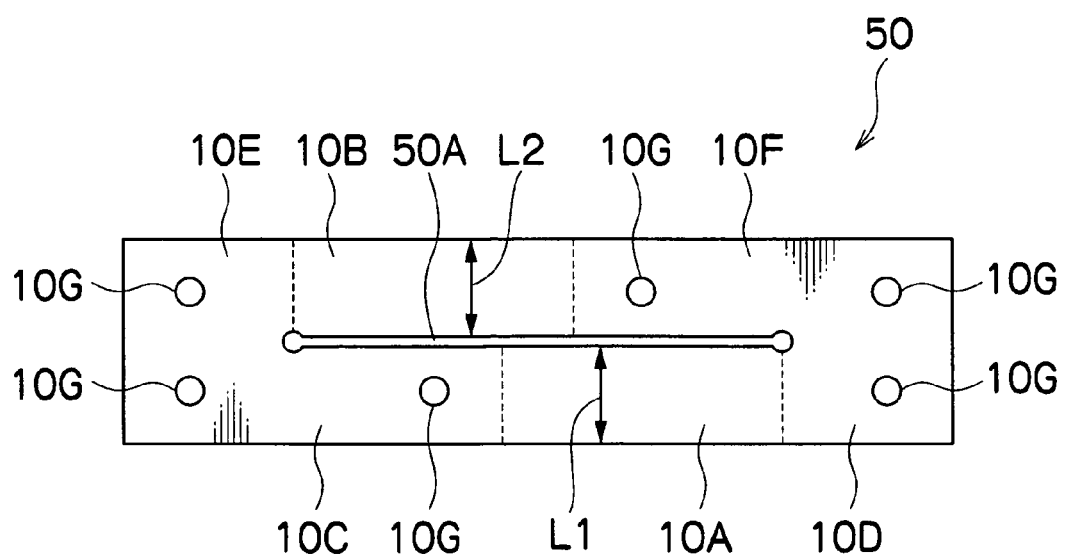
FIG. 3 is a plan view of the rocking fulcrum member before forming.

The rocking fulcrum member 10 is integrally formed into a state shown in FIGS. 1 and 2 from one elastic plate member 50 shown in FIG. 3. A large-size elastic plate member is first punched with a punching press to form the elastic plate member 50, six attachment holes 10G and a central slit 50A, and the elastic plate member 50 is thereafter press-formed so as to be bent through predetermined angles at positions indicated by dotted lines in FIG. 3. A heat treatment is performed on the formed member to improve the spring characteristic.

The width L1 of the first elastic plate portion and the width L2 of the second elastic plate portion are equal to each other and the precise crisscross spring fulcrum is formed in a torsion-free condition.

Figure 4:
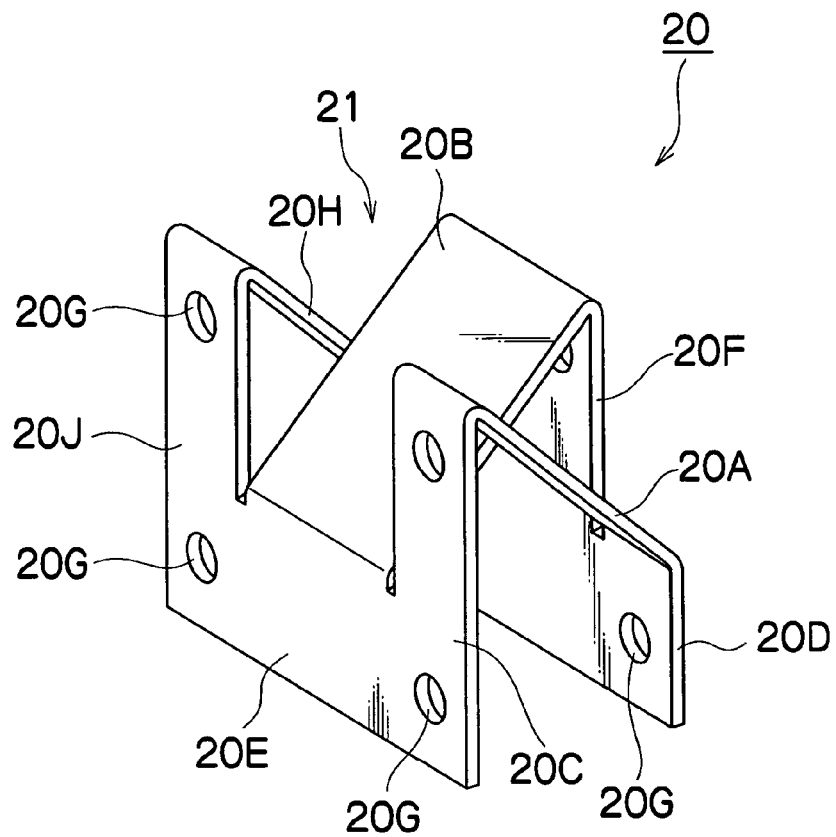
FIG. 4 is a perspective view of an example of a modification of the embodiment.

FIG. 4 is a perspective view showing an example of a modification of the embodiment of the rocking fulcrum member in accordance with the present invention. A rocking fulcrum member 20 has a first elastic plate portion 20A, a second elastic plate portion 20B and a third elastic plate portion 20H. The first elastic plate portion 20A and the third elastic plate portion 20H are placed parallel to each other with a certain spacing provided therebetween. The second elastic plate portion 20B is placed between the first elastic plate portion 20A and the third elastic plate portion 20H.

The surfaces of the first elastic plate portion 20A, the third elastic plate portion 20H and the second elastic plate portion 20B cross each other at right angles to form a crisscross spring 21.

An extension 20C from one end of the first elastic plate portion 20A is bent at 45° from the first elastic plate portion 20A, while an extension 20D from the other end of the first elastic plate portion 20A is bent at 135° from the first elastic plate portion 20A.

An extension 20E from one end of the second elastic plate portion 20B is bent at 135° from the second elastic plate portion 20B, while an extension 20F from the other end of the second elastic plate portion 20B is bent at 45° from the second elastic plate portion 20B.

Further, an extension 20J from one end of the third elastic plate portion 20H is bent at 45° from the third elastic plate portion 20H, while an extension 20K (shown in FIG. 5 referred to below) from the other end of the third elastic plate portion 20H is bent at 135° from the third elastic plate portion 20H.

The extension 20C from one end of the first elastic plate portion, the extension 20E from one end of the second elastic plate portion and the extension 20J from one end of the third elastic plate portion are formed integrally with each other to form one generally concave flat plate, and the extension 20D from the other end of the first elastic plate portion, the extension 20F from the other end of the second elastic plate portion and the extension 20K from the third elastic plate portion are also formed integrally with each other to form one generally convex flat plate. Four attachment holes 20G for attachment of a member in the concave flat plate, and three attachment holes 20G for attachment of a member in the convex flat plate are formed.

In the rocking fulcrum member 20 having the above-described structure, the generally concave flat plate portions and the generally convex flat plate portions are parallel to each other in a no-load condition, as are the corresponding portions of the above-described rocking fulcrum member 10. When a force is applied to the generally concave flat plate portions in such a direction that the generally convex flat plate portions are brought closer to each other or moved away from each other, rocking on the crisscross fulcrum formed by the first elastic plate portion 20A, the third elastic plate portion 20H and the second elastic plate portion 20B is caused.

Figure 5:
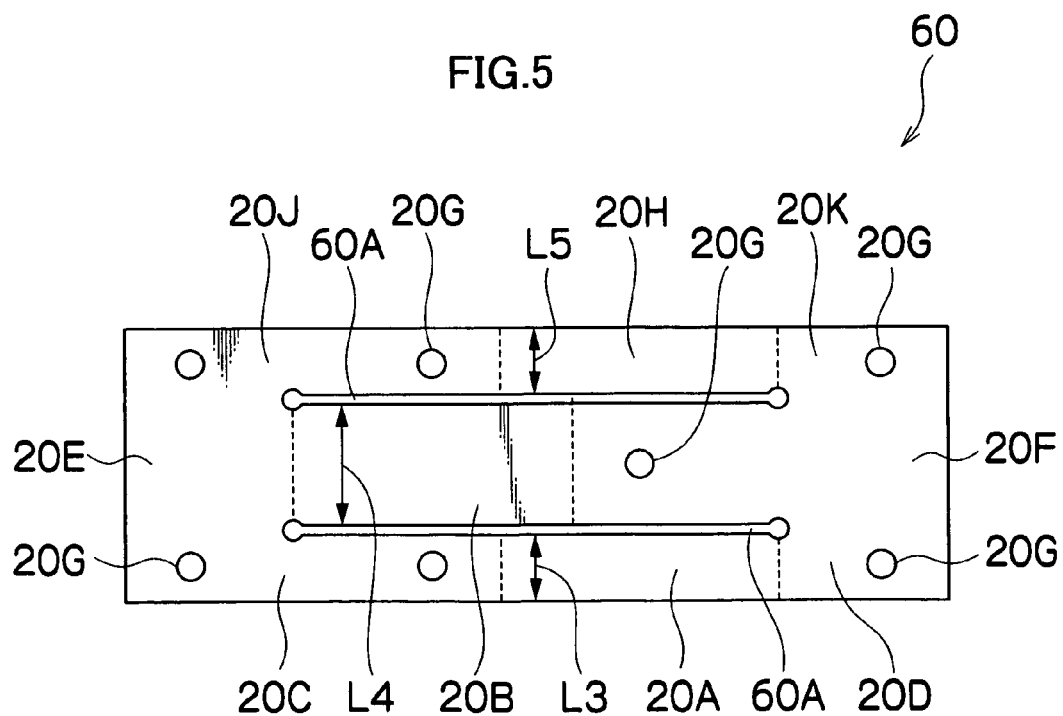
FIG. 5 is a plan view of the rocking fulcrum member in the modification of the embodiment before forming.

The rocking fulcrum member 20 is integrally formed into a state shown in FIG. 4 from one elastic plate member 60 shown in FIG. 5, as is the above-described rocking fulcrum member 10. A large-size elastic plate member is first punched with a punching press to form the elastic plate member 60, seven attachment holes 20G and two central slits 60A, and the elastic plate member 60 is thereafter press-formed so as to be bent through predetermined angles at positions indicated by dotted lines in FIG. 5. A heat treatment is performed on the formed member to improve the spring characteristic.

The width L3 of the first elastic plate portion and the width L5 of the third elastic plate portion are equal to each other and the sum of the width L3 of the first elastic plate portion and the width L5 of the third elastic plate portion is equal to the width L4 of the second elastic plate portion. The precise crisscross fulcrum is formed in a torsion-free condition.

Figure 6:
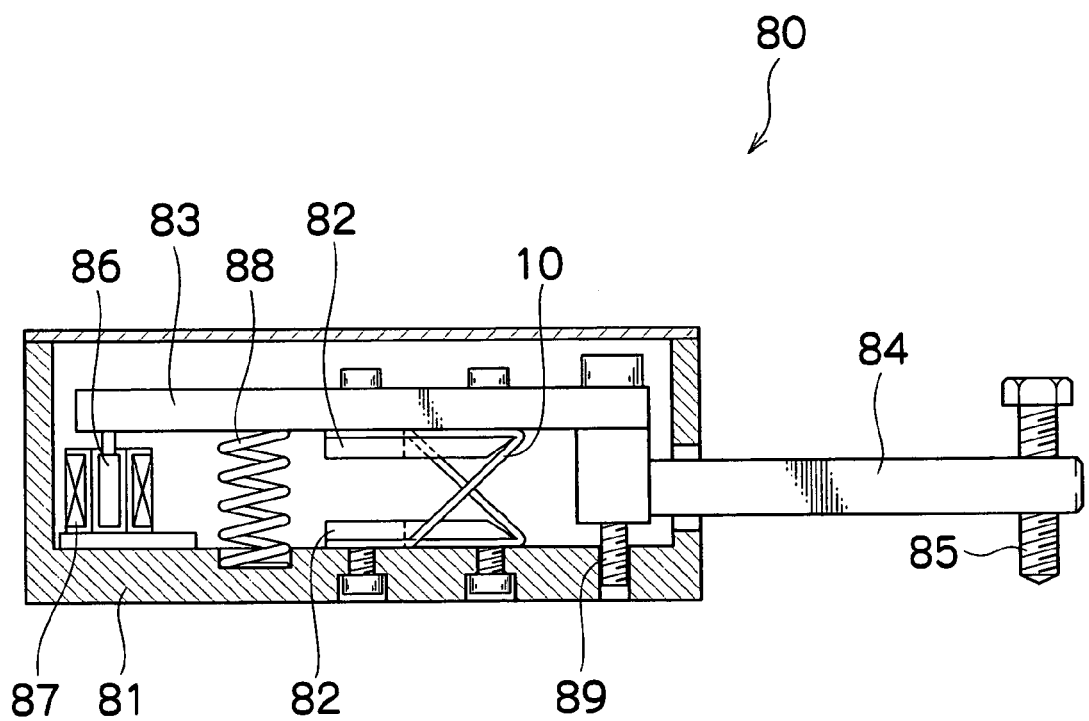
FIG. 6 is a sectional side view of an example of an application of the rocking fulcrum member of the present invention.

FIG. 6 shows an example of an application of the rocking fulcrum member 10 in accordance with the present invention to a rocking fulcrum for a measuring head 80. In the measuring head 80, one of the L-shaped flat plate portions of the rocking fulcrum member 10 is screwed to a measuring head body 81 by using the three attachment holes 10G and an attachment plate 82 having three threaded holes, as shown in FIG. 6.

An arm member 83 is screwed to the other L-shaped flat plate portion of the rocking fulcrum member 10 by using another attachment plate 82. A finger 84 is attached to a fore end of the arm member 83. A contactor 85 is attached to a tip of the finger 84. A core 86 of a differential transformer is attached to a rear end of the arm member 83. A coil 87 of the differential transformer is attached to the measuring head body 81.

A compression coil spring 88 is provided between the measuring head body 81 and the arm member 83 to apply a measuring pressure to the contactor 85. A stopper screw provided in the measuring head body 81 is used to set a rocking lower end of the arm member 83.

In the measuring head 80 having the above-described structure, the arm member 83 seesaws on the crisscross spring fulcrum formed by the rocking fulcrum member 10. The amount of movement of the contactor 85 when the contactor 85 is in contact with a work is detected with the differential transformer, thus making an accurate measurement.

The rocking fulcrum member 10 is a press-formed crisscross spring fulcrum member integrally formed as described above. Therefore, the rocking fulcrum member 10 can be manufactured at a low cost and easily mounted, are free from variations in crisscross spring fulcrum characteristic due to variations in the mounted state and can be suitably used as a precise rocking fulcrum.

In the above-described embodiment, the crisscross spring in which the surfaces of the first elastic plate spring portion 10A and the second elastic plate spring portion 10B cross each other at right angles is formed. In the example of modification of the embodiment, the crisscross spring in which the surfaces of the first elastic plate spring portion 20A, the third elastic plate spring portion 20H and the second elastic plate spring portion 20B cross each other at right angles is formed. However, the crossing angle between these portions in the arrangement of the present invention may be different from 90°.

What is claimed is:

1. A rocking fulcrum member, comprising:
   a first elastic plate portion; and
   a second elastic plate portion placed on planes intersecting each other to form a crisscross spring,
   wherein each of the first elastic plate portion and the second elastic plate portion has extensions from its one end and the other end in its longitudinal direction;
   the extension from the one end of the first elastic plate portion is bent at an acute angle from the first elastic plate portion, while the extension from the other end of the first elastic plate portion is bent at an obtuse angle from the first elastic plate portion;
   the extension from the one end of the second elastic plate portion is bent at an obtuse angle from the second elastic plate portion, while the extension from the other end of the second elastic plate portion is bent at an acute angle from the second elastic plate portion;

the extension from the one end of the first elastic plate portion and the extension from the one end of the second elastic plate portion are formed as one continuous member on one plane;

the extension from the other end of the first elastic plate portion and the extension from the other end of the second elastic plate portion are formed as one continuous member on one plane; and the first elastic plate portion, the extension from the one end of the first elastic plate portion, the extension from the other end of the first elastic plate portion, the second elastic plate portion, the extension from the one end of the second elastic plate portion and the extension from the other end of the second elastic plate portion are a continuous member formed by fabricating one elastic member in the form of a plate.

2. A rocking fulcrum member, comprising: a first elastic plate portion, a second elastic plate portion, and a third elastic plate portion, the first elastic plate portion and the third elastic plate portion being placed parallel to each other on one plane, the second elastic plate portion being placed between the first elastic plate portion and the third elastic plate portion, the first elastic plate portion, the third elastic plate portion and the second elastic plate portion being placed on planes intersecting each other to form a crisscross spring, wherein each of the first elastic plate portion, the second elastic plate portion and the third elastic plate portion has extensions from its one end and the other end in its longitudinal direction;

the extension from the one end of the first elastic plate portion is bent at an acute angle from the first elastic plate portion, while the extension from the other end of the first elastic plate portion is bent at an obtuse angle from the first elastic plate portion;

the extension from the one end of the second elastic plate portion is bent at an obtuse angle from the second elastic plate portion, while the extension from the other end of the second elastic plate portion is bent at an acute angle from the second elastic plate portion;

the extension from the one end of the third elastic plate portion is bent at an acute angle from the third elastic plate portion, while the extension from the other end of the third elastic plate portion is bent at an obtuse angle from the third elastic plate portion;

the extension from the one end of the first elastic plate portion, the extension from the one end of the second elastic plate portion and the extension from the one end of the third elastic plate portion are formed as one continuous member on one plane;

the extension from the other end of the first elastic plate portion, the extension from the other end of the second elastic plate portion and the extension from the other end of the third elastic plate portion are formed as one continuous member on one plane; and the first elastic plate portion, the extension from the one end of the first elastic plate portion, the extension from the other end of the first elastic plate portion, the second elastic plate portion, the extension from the one end of the second elastic plate portion, the extension from the other end of the second elastic plate portion, the third elastic plate portion, the extension from the one end of the third elastic plate portion and the extension from the other end of the third elastic plate portion are a continuous member formed by fabricating one elastic member in the form of a plate.

3. The rocking fulcrum member according to claim 2, wherein sum of a width of the first elastic plate portion and a width of the third elastic plate portion is equal to a width of a second elastic plate portion.

4. The rocking fulcrum member according to claim 2, wherein an attachment hole for attachment of a member is formed in each of the continuous member on a plane in which the extension from the first end of each elastic plate portion is formed and the continuous member on a plane in which the extension from the second end of each elastic plate portion is formed.

5. The rocking fulcrum member according to claim 3, wherein an attachment hole for attachment of a member is formed in each of the continuous member on a plane in which the extension from the first end of each elastic plate portion is formed and the continuous member on a plane in which the extension from the second end of each elastic plate portion is formed.

6. The rocking fulcrum member according to claim 2, wherein a heat treatment is performed on the crisscross spring formed by fabricating the one elastic member in the form of a plate.

7. The rocking fulcrum member according to claim 3, wherein a heat treatment is performed on the crisscross spring formed by fabricating the one elastic member in the form of a plate.

8. The rocking fulcrum member according to claim 4, wherein a heat treatment is performed on the crisscross spring formed by fabricating the one elastic member in the form of a plate.

9. The rocking fulcrum member according to claim 5, wherein a heat treatment is performed on the crisscross spring formed by fabricating the one elastic member in the form of a plate.

10. A rocking fulcrum member, comprising:

at least two elastic plate portions which are arranged serially with an odd number elastic plate portion and an even number elastic plate portion being located on planes that intersect each other to form a cross spring, wherein each of the elastic plate portions has an extension extending in a longitudinal direction from each of first and second ends thereof;

wherein the extension extending from the first end of each odd number elastic plate portion is bent at an acute angle from the odd number elastic plate portion from which it extends while the extension extending from the second end of each odd number elastic plate portion is bent at an obtuse angle from the odd number elastic plate portion from which it extends;

wherein the extension extending from the first end of each even number elastic plate portion is bent at an obtuse angle from the even number elastic plate portion from which it extends while the extension extending from the second end of each even number elastic plate portion is bent at an acute angle from the even number elastic plate portion from which it extends;

wherein the extension from the first end of the odd number elastic plate portion and the extension from the first end of the even number elastic plate portion are formed as a continuous member on one plane;

wherein the extension from the second end of the odd number elastic plate portion and the extension from the second end of the even number elastic plate portion are formed as one continuous member on one plane; and wherein the odd number elastic plate portion, the extension from the first end of the odd number elastic plate portion, the extension from the second end of the odd number elastic plate portion, the even number elastic plate portion, the extension from the first end of the even number elastic plate portion and the extension from the second end of the even number elastic plate portion are a continuous member fabricated from a plate.

11. The rocking fulcrum member, according to claim 10, wherein a width of the odd elastic plate portion and a width of the even elastic plate portion are equal to each other.

12. The rocking fulcrum member according to claim 10, wherein an attachment hole for attachment of a member is formed in each of the continuous member on plane in which the extension from the first end of each elastic plate portion is formed and the continuous member on plane in which the extension from the second end of each elastic plate portion is formed.

13. The rocking fulcrum member according to claim 11, wherein an attachment hole for attachment of a member is formed in each of the continuous member on one plane in which the extension from the one end of each elastic plate portion is formed and the continuous member on one plane in which the extension from the other end of each elastic plate portion is formed.

14. The rocking fulcrum member according to claim 10, wherein a heat treatment is performed on the cross spring formed by fabricating the elastic member from a plate.

15. The rocking fulcrum member according to claim 11, wherein a heat treatment is performed on the crisscross spring formed by fabricating the one elastic member in the form of a plate.

16. The rocking fulcrum member according to claim 12, wherein a heat treatment is performed on the cross spring formed by fabricating the elastic member from a plate.

17. The rocking fulcrum member according to claim 13, wherein a heat treatment is performed on the crisscross spring formed by fabricating the one elastic member in the form of a plate.

* * * * *